United States Patent [19]
Walbridge et al.

[11] Patent Number: 4,877,422
[45] Date of Patent: Oct. 31, 1989

[54] MOBILE AERIAL LIFT WITH BOOM STRUCTURE HAVING INSULATED BOOM SECTION CONTAINING A CLEAN, MOISTURE FREE ENVIRONMENT AND METHOD

[75] Inventors: Van J. Walbridge, Arvada; R. Michael Donohue, Berthoud, both of Colo.

[73] Assignee: GK Technologies, Inc., Woodcliff Lake, N.J.

[21] Appl. No.: 265,508

[22] Filed: Nov. 1, 1988

[51] Int. Cl.$^4$ .............................................. B01D 53/04
[52] U.S. Cl. ............................................ 55/20; 55/21; 55/163; 182/2
[58] Field of Search ..................... 55/20, 33, 163, 21; 182/2, 52

[56] References Cited
U.S. PATENT DOCUMENTS 3,080,693 3/1963 Glass et al. ........................... 55/163
3,139,948 7/1964 Rolden ................................. 182/2
3,320,524 5/1967 Miller ............................... 182/2 X
3,923,479 12/1975 Glass et al. .......................... 55/163

*Primary Examiner*—Charles Hart
*Attorney, Agent, or Firm*—Flehr, Hohbach, Test, Albritton & Herbert

[57] ABSTRACT

A mobile aerial lift having a vehicle and a boom structure mounted on a vehicle. The boom structure has an outer extremity. A workman's basket is mounted on the outer extremity. A control is carried by the boom structure and is accessible to the workman's basket for controlling operation of the boom structure. The boom structure has an insulated boom section and an exclosed space is provided for at least a portion of the insulated boom section. Gas is supplied under positive pressure to the enclosed space and provides a clean, relatively moisture-free environment for a portion of the interior of the insulated boom section and maintains the electrical insulating properties of the insulated boom section.

11 Claims, 3 Drawing Sheets

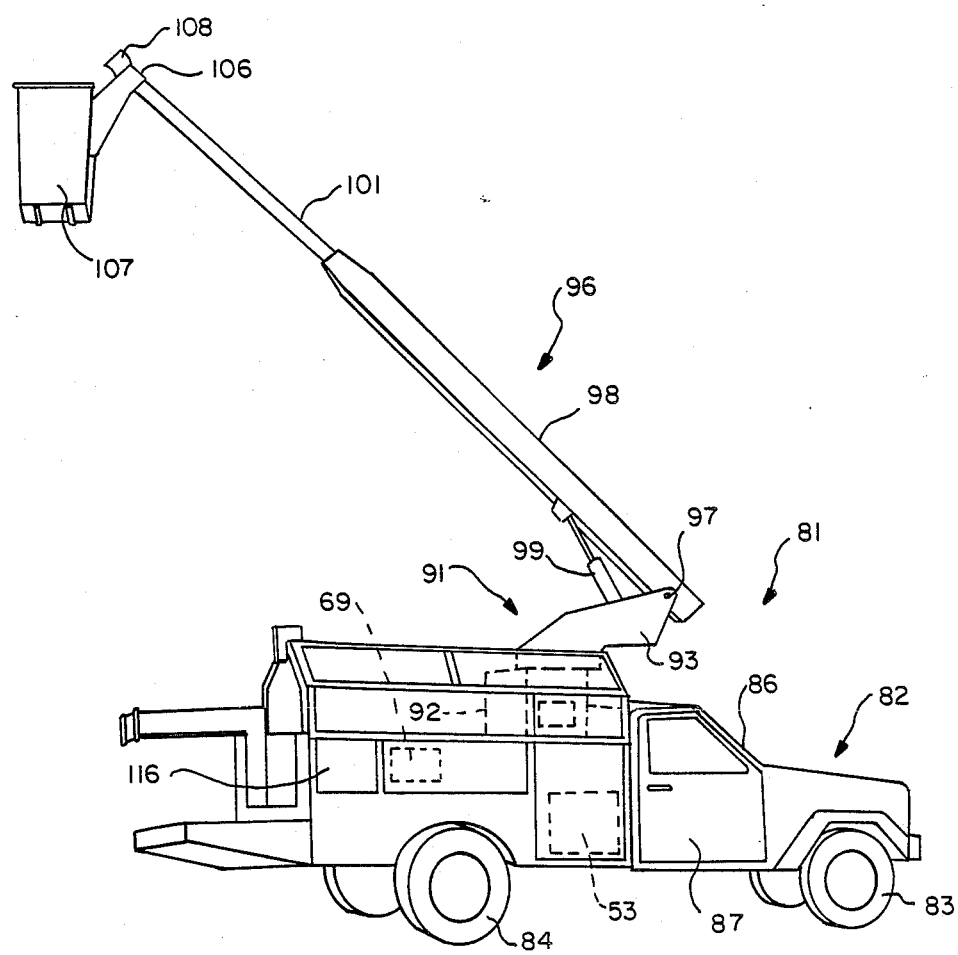
FIG.−4
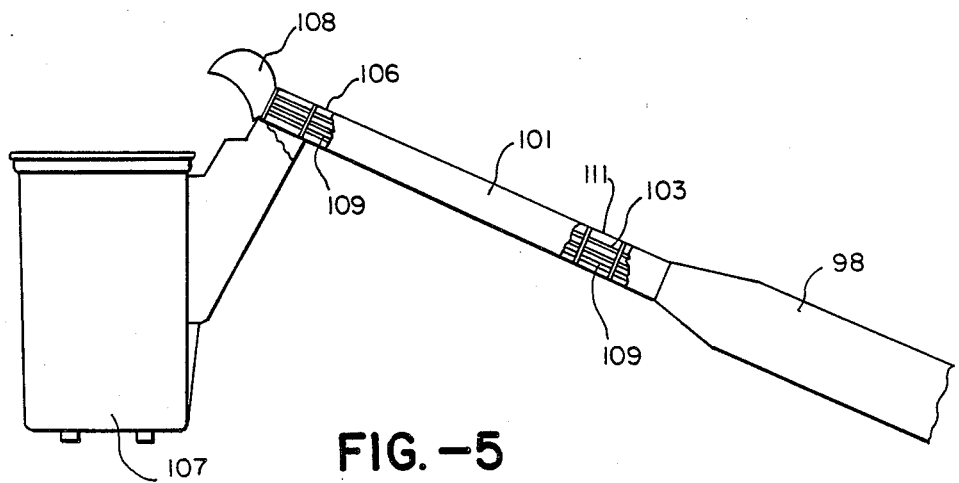
FIG.−5

MOBILE AERIAL LIFT WITH BOOM STRUCTURE HAVING INSULATED BOOM SECTION CONTAINING A CLEAN, MOISTURE FREE ENVIRONMENT AND METHOD

This invention relates to a mobile aerial lift with boom struction having an insulated boom section containing a clean, moisture free environment and method.

Mobile aerial lifts have heretofore been provided with boom structures. In order to provide desired insulation for the workman's basket carried by the outer end of the boom structure, such boom structures have been provided with an insulated boom section. Attempts have heretofore been made to keep such insulated boom sections free of dirt and grime by sealing off those sections from the ambient atmosphere and by providing a desiccant chamber containing a desiccant within the chamber for the insulated boom section. The desiccant chamber is provided with a window through which the desiccant can be viewed which had a conventional color of blue when dry and which turned pink when it became wet. This change in coloration of the desiccant took at least several hours and possibly at least as long as a day before changing color to give a warning that moisture was present in the sealed enclosure for the insulated boom section. It has been found that such apparatus has been inadequate for maintaining the insulating characteristics of an insulated boom section for a number of reasons. The desiccant provided in the enclosure for the boom section had a limited capacity to absorb large amounts of water. In addition, the warning system given was only given after moisture had already been encountered, thus giving a warning which was too late and in fact had informed the operator what had happened and not what was happening at that particular point in time. There is therefore a need for a new and improved aerial lift which overcomes these disadvantages.

In general it is an object of the invention is to provide a mobile aerial lift with insulated boom structure which has an insulated boom section in which at least a portion of the insulated boom section is provided with a clean moisture-free environment and a method for accomplishing the same.

Another object of the invention is to provide a lift and method of the above character in which a supply of clean moisture-free air is supplied to the insulated boom section.

Another object of the invention is to provide a lift and method of the above character in which air exhausted or purged from the insulated boom section is monitored to check the moisture content thereof.

Another object of the invention is to provide a lift and method of the above character in which an alarm is sounded when the moisture in the monitored air exceeds a predetermined percentage.

Another object of the invention is to provide a lift and method of the above character in which the air in the insulated boom section is purged to the atmosphere.

Additional objects and features of the invention will appear from the following description in which the preferred embodiments are set forth in detail in conjunction with the accompanying drawings.

FIG. 4 is a perspective view of another embodiment of a mobile aerial lift incorporating the present invention in which a telescoping boom structure is utilized.

FIG. 5 is a cross sectional view of a portion of an insulated boom section utilizing the boom structure of the mobile aerial lift of FIG. 4.

Figure 1:
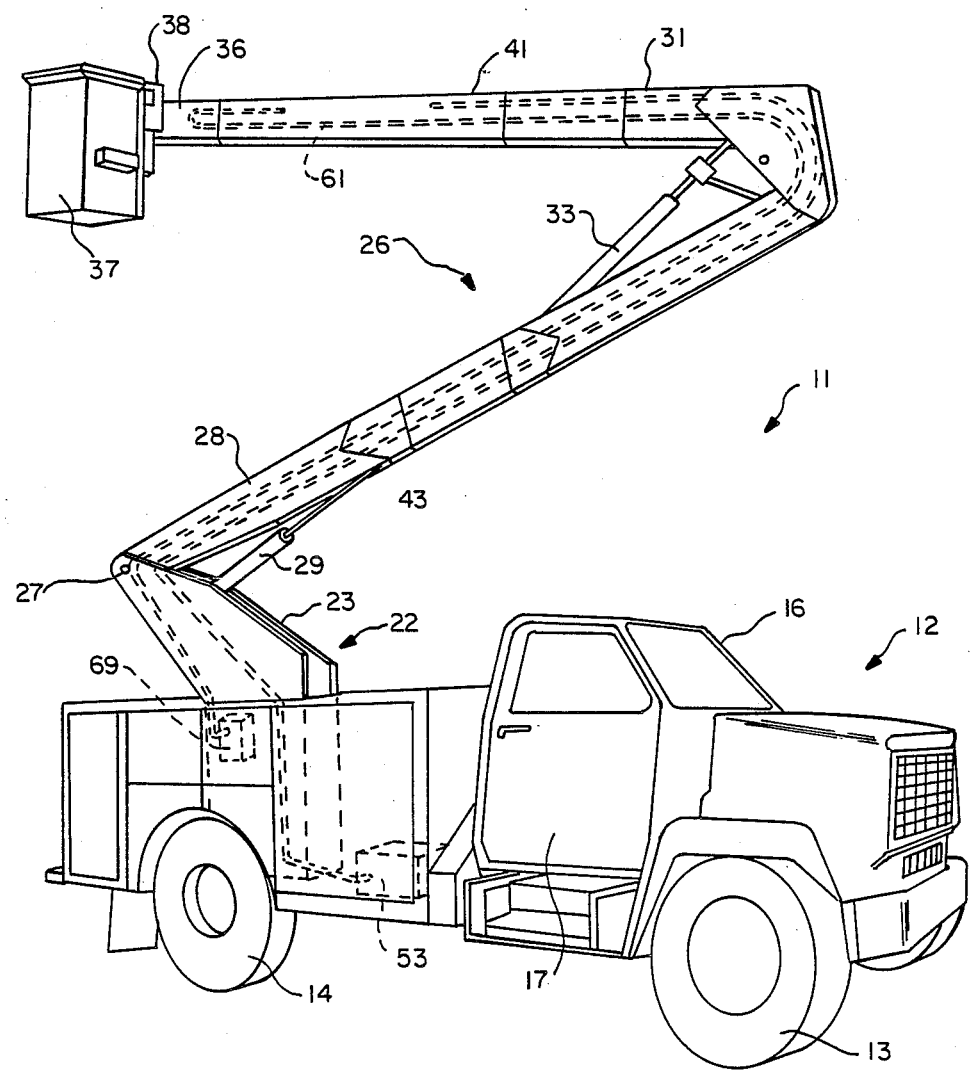
FIG. 1 is a perspective view of a mobile aerial lift incorporating the present invention in which an articulated boom structure is utilized.

In general, the mobile aerial lift of the present invention consists of a vehicle. A boom structure is mounted on the vehicle and has an outer extremity. A workman's basket is carried by the outer extremity. Control means is carried by the boom structure and is accessible from the workman's basket for operation of the boom structure. The boom structure has an insulated boom section. Means provides an enclosed space in at least a portion of the insulated boom section to provide a clean substantially moisturefree environment in that portion of the insulated boom section to maintain the electrical properties of the insulated boom section. Gas is supplied to and is purged from the enclosed space. The purged gas can be monitored to determine whether the purged gas has more than a predetermined moisture content.

More in particular, the mobile aerial lift of the present invention consists of a motorized vehicle 12 which is provided with front and rear wheels 13 and 14. A cab 16 is provided on the front part of the vehicle and provides space for a driving station (not shown) in which the operator can control the operation of a motor (not shown) for driving the rear wheels 14 of the vehicle 12. The cab 16 is provided with side doors 17 to permit ingress and egress from the cab 16.

An aerial lift 1 is mounted on the frame (not shown) of the vehicle 12 to the rear of the cab 16 and generally overlies the axis of the rear wheels 14 and consists of a boom support structure 22 which is rotatably mounted for rotation about a vertical axis. The support structure 22 includes a pair of spaced parallel arms 23 which pivotally mount a boom structure 26 for pivotal movement about a generally horizontal axis represented by the pivot point 27. The boom structure 26 is comprised of a lower boom 28 which is pivotally mounted on the pivot point 27. Means is provided for raising and lowering the outer extremity of the lower boom 28 about the horizontal axis provided by the pivot pin and consists of a hydraulic actuator 29.

The boom structure 26 also includes an upper boom 31 which has its lower extremity pivotally mounted on the lower boom 28 for movement about a horizontal axis. A hydraulic actuator 33 is provided for causing such pivotal movement of the upper boom 31 with respect to the lower boom 28. The upper boom 31 is provided with an outer extremity 36.

A workman's basket 37 is pivotally mounted on the outer extremity 36. A control assembly 38 is carried by the boom structure 26 and is accessible from the workman's basket 37 to control the operation of the boom structure whereby the outer extremity 36 in the workman's basket 37 carried thereby can be rotated about a vertical axis raised and lowered and moved toward and away from the vehicle.

Figure 3:
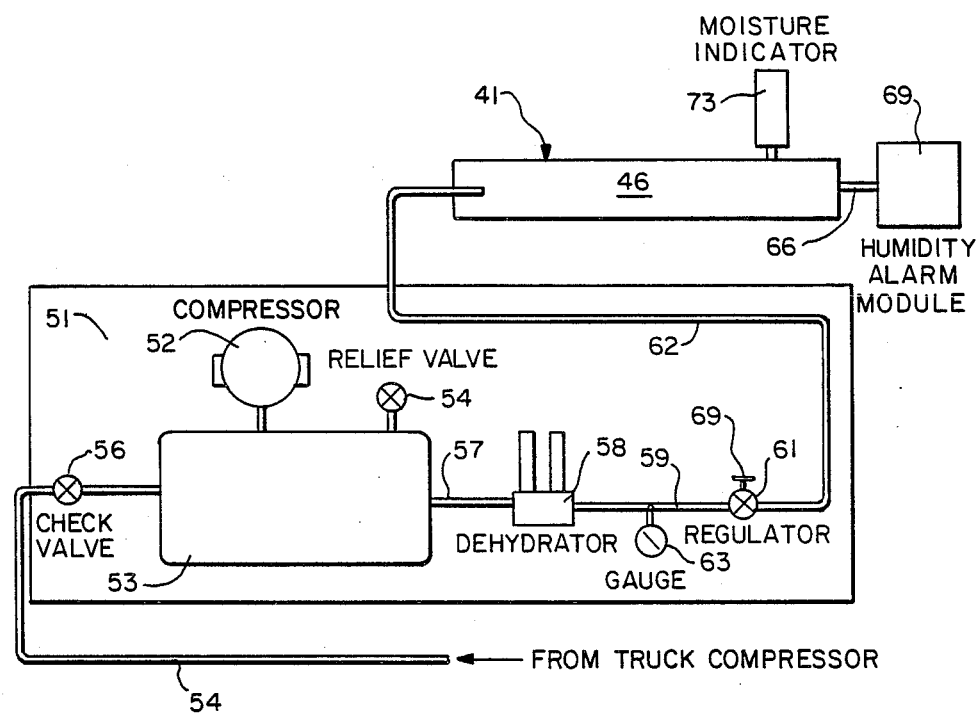
FIG. 3 is a schematic diagram of the dry air system utilized in the mobile aerial lift shown in FIG. 1.

The upper boom 31 is provided with a section or portion 41 which is formed of a suitable insulating material such as fiberglass. The control assembly 38 is of a conventional type and is insulated from the vehicle 12 in a suitable manner, as for example, by the use of hydraulic control lines (not shown) so that the insulating capabilities provided by the insulated boom section are not compromised. A leveling rod 42 which extends through the sealed boom section is formed of a suitable insulating material such as fiberglass. The leveling rod is utilized for maintaining the level of the workman's basket 37 as the outer end of the boom structure is raised and lowered. Suitable sealing means such as O-ring seals 43 are provided at the opposite ends of the boom section 41 sealingly engaging the leveling rod 42 to permit the leveling rod 42 to travel therethrough while still providing a relatively air-tight space 46 within the interior of the insulated boom portion 41. In accordance with the present invention, air supply means 51 is provided for continuously supplying a clean, moisture-free environment in the space 46 within the insulated boom section 41. The air supply means 51 consists of an air compressor 52 carried by the vehicle 12. The air compressor 52 can be a separate air compressor carried by the vehicle which supplies air to an air tank 53 that is provided with a safety relief valve 54. For example, the air compressor can be operated from the 12 volt supply on the vehicle. Alternatively, air can be supplied to the tank 53 from the truck compressor utilized for supplying the air brake system through a line 54 through a check valve 56 to the tank 53. Air from the air tank 53 is supplied through piping 57 to a dehydrator 58 which, by way of example, can be a heatless air dryer of the type supplied by PUREGAS Apparatus Division of General Cable Company at Westminster, Colo. 80030. The ultra-dry air which is supplied by the dehydrator 58 is supplied through piping 59 to a regulator 61. Additional non-conductive flexible tubing 62 is provided for supplying the clean, moisture-free air to the space 46 within the sealed insulated boom section 41. This tubing 62 is threaded up through the boom structure in the manner shown in FIG. 1. A gauge 63 is provided for measuring the pressure of the air being supplied from the dehydrator 58 and is connected into the piping 59. The regulator 61 supplies gas into the space 46 at a controlled rate and pressure as determined by the adjustment of the handle 64. As for example, dry gas can be supplied to the space 46 at a rate ranging from 100 to 4000 and preferably a rate of approximately 300 cubic centimeters per minute at a pressure ranging from 1 psig to 5 psig to ensure that the space 46 is continuously filled with moisture-free clean gas. As shown in FIG. 3, the gas can be introduced into the sealed boom section 41 at one end of the boom section 41.

Figure 2:
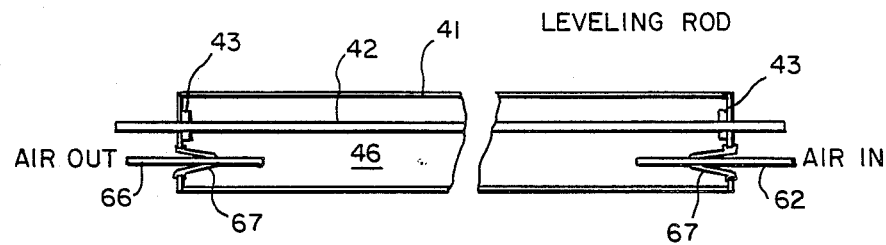
FIG. 2 is a cross-sectional view of the insulated boom section in the mobile aerial lift shown in FIG. 1.

At the other end of the boom section 41, air is removed or purged from the space 46. For example, air can be removed from the boom section by utilizing a flexible non-conducting piping or tubing 66. As shown in FIG. 2, the air inlet piping 62 and the air outlet piping 66 is surrounded by seals 67 provided in the boom section for preventing the leakage of air from the boom section around the piping or tubing 62 and 66. The non-conducting piping 66 is also threaded down through the upper and lower booms 31 and 28 and is connected to a humidity alarm module 69 which can be mounted within one of the storage cabinets 71 provided on the vehicle to the rear of the cab 16. The humidity alarm module 69 can be of a conventional type and is utilized for measuring the moisture content in the air being returned from the insulated boom section and can be programmed to initiate visible and/or audible alarms in the event the humidity reaches a non-desired level, as for example, a level in excess of 10% by volume. The actuation of the alarm warns the operator of the vehicle of a potential problem arising in connection with the insulated section or portion of the boom 41. The returned air after passing through the humidity alarm module 69 is purged to the atmosphere.

When it is not desired to actuate a humidity alarm module 69 as, for example, when it is desired to reduce the expense of the system, the air can be purged directly to the atmosphere from the other end of the boom section 41 through suitable means, as for example, a pressure release valve (not shown) adapted to purge air to the atmosphere when the air pressure rises above a pre-determined level within the space 46 as, for example, above 5 psi. If a moisture indication is desired, the air can be bled off through a moisture indicator 73 which contains a conventional desiccant which turns from blue to pink in the event there is substantial moisture present in the air being exhausted from the space 46 of the sealed boom section 41 thereby also giving a positive indication of the presence of moisture in the air and indicating a pending problem with respect to the insulating qualities of the insulated section 41.

It can be seen that by utilizing a pressurized system for the space 46 in which substantially moisturefree clean air is continuously supplied to the space 46 to inhibit moisture entering into the insulated boom section and also to prevent dirt and other grime to enter the boom section to thereby maintain the insulating qualities of the material utilized for formation of the insulated boom section 41. In addition and in the event, moisture does enter into this space 46, means is provided for giving a visual or audible alarm to warn the operator of an impending problem with respect to the insulating capabilities of the insulated boom section 41. Although air is supplied continuously to the space 46, it should be appreciated that air can be supplied at periodic intervals to the space 46 to obtain substantially equivalent results.

Another embodiment of the invention is shown in FIGS. 4 and 5 in which a mobile aerial lift 81 is provided which consists of a vehicle 82 having front and rear wheels 83 and 84. A cab 86 is mounted on the vehicle 82 which is provided with doors 87 for ingress and egress from the cab 86.

An aerial lift 91 is mounted on the vehicle 82 and is provided with a support structure 92 which is rotated about a vertical axis. The support structure as shown in FIG. 4 is mounted immediately to the rear of the cab 86. It is provided with spaced parallel support arms 93. A boom structure 96 is mounted on the arms 93 for pivotal movement about a horizontal axis provided by the pivot point 97. The boom structure 96 consists of a lower or outer boom structure 98 which is raised and lowered about the pivot point 97 by a hydraulic actuator 99. The boom structure 96 also includes an upper or inner boom 101 which is adapted to be extended and retracted in a conventional manner with respect to the outer or lower boom 98. The boom structure 96 is provided with an outer extremity 106. A workman's basket 107 is pivotally mounted on the outer extremity 106. A control assembly 108 is carried by the boom structure 96 and is positioned in such a manner so that is it accessible to a workman in the workman's basket 107. By the use of a hooded control assembly 108, the outer extremity 106 of the boom structure 96 can be rotated about a vertical axis, raised and lowered about a horizontal axis and extended toward and away from the vehicle 82. As shown particularly in FIG. 5, the inner boom 101 is formed of spiral wound fiberglass. Thus, at least a portion of the inner boom 101 is formed of an insulating material. The control assembly 108 provided actuates fiberglass rods 109 which extend through a sealed space in the inner boom 101. Suitable means (not shown) is provided for establishing seals between the control rods 109 and the boom section 101 so that the space 111 can be relatively air-tight.

Air supply means 51 of the type hereinbefore described is provided in this embodiment of the aerial lift as in the embodiment of the aerial lift shown in FIGS. 1 and 2. Air is supplied to and from the insulated boom 101 in generally the same manner as supplied to the sealed boom section 41. The humidity alarm module 69 as well as the air tank 53 can be mounted on the vehicle in the cabinetry 116 provided to the rear of the cab 86.

In this way it can be seen that mobile aerial lifts with boom structures have insulated boom sections that are provided with a clean, substantially moisture-free environment to ensure that the insulating properties of the insulated boom section are maintained. In addition, alarm capabilities are provided to advise the operator that the insulating qualities of the insulated boom structure are being compromised by the presence of moisture in the air being bled off from the sealed space in the boom. The present invention is directed to the portions of the insulated boom sections whichaare concealed from view. The outer portions of the boom can be kept clean and dry by merely observation of the same and removing moisture and contamination and grime from the outer portion of the boomstructure. However, it should be appreciated in accordance with the present invention that, if desired, and particularly with respect to the articulated boom structure, the outer portions of the insulated boom sections can be enclosed so that the environment surrounding the same remains clean and relatively moisture-free.

Although the present invention has been directed to the use of compressed air, it should be appreciated that if desired other dry gasses such as nitrogen can be utilized.

What is claimed is:

1. In a mobile aerial lift, a vehicle, a boom structure mounted on the vehicle having an outer extremity, a workman's basket mounted on the outer extremity, control means carried by the boom structure and accessible to the workman's basket for controlling operation of the boom structure, the boom structure having an insulated boom section, means providing enclosed space for at least a portion of the insulated boom section, and means for supplying a gas under positive pressure to the enclosed space to provide a clean, relatively moisture-free environment for a portion of the interior of the insulated boom section to maintain the electrical insulating properties of the insulated boom section.

2. An aerial lift as in claim 1 together with means for exhausting gas from the space.

3. An aerial lift as in claim 2 together with means for monitoring the gas which is exhausted from the space to ascertain the moisture content in the gas and actuating an alarm when the moisture content in the gas exceeds a predetermined level.

4. A lift as in claim 1 wherein the control means includes rod-like elements extending through the space in the insulated section of the boom structure and sealing means engaging the rod-like elements for maintaining the sealed nature of the space.

5. A lift as in claim 1, wherein the means for supplying a gas includes a dehydrator.

6. A lift as in claim 5 together with regulator means for controlling the pressure of the gas supplied to the enclosed space in the boom.

7. A lift as in claim 2 wherein said means for supplying the gas to the sealed space includes nonelectrical conductive tubing.

8. In a method for preserving the insulating integrity of an insulated boom section of a boom structure carried by an aerial lift and having an enclosed space at least a portion of which is defined by an insulated boom section, supplying a gas under pressure, removing moisture from the gas and supplying the gas to the enclosed space to provide a relatively clean, moisture-free environment in the sealed space carried by the boom section and exhausting gas from the enclosed space in the insulated boom section.

9. A method as in claim 8 together with the step of maintaining a predetermined pressure within the sealed boom section.

10. A method as in claim 8, together with the step of monitoring the exhaust to ascertain the moisture content therein.

11. A method as in claim 10, together with the step of initiating an alarm when a predetermined moisture content is ascertained to be present in the gas.

* * * * *